United States Patent
Wang et al.

(10) Patent No.: US 6,266,365 B1
(45) Date of Patent: Jul. 24, 2001

(54) CDMA RECEIVER

(75) Inventors: Zhaocheng Wang; Tao Zhang; Noriyoshi Ito; Hiroki Sugimoto, all of Singapore (SG)

(73) Assignee: Oki Techno Centre, Singapore (SG)

( * ) Notice: Subject to any disclaimer, the term of this patent is extended or adjusted under 35 U.S.C. 154(b) by 0 days.

(21) Appl. No.: 09/572,625

(22) Filed: May 17, 2000

(30) Foreign Application Priority Data

May 28, 1999 (SG) .................................................. 9902928-2

(51) Int. Cl.[7] .............................. A61F 2/06; H04L 27/30
(52) U.S. Cl. ............................. 375/150; 370/342; 370/441
(58) Field of Search .................................. 375/130, 136, 375/137, 140, 142, 145, 147, 149, 150, 367, 362, 355, 354, 141; 370/320, 335, 342, 441, 503, 515, 516, 209, 203, 517, 518; 714/707

(56) References Cited

U.S. PATENT DOCUMENTS

| 5,408,504 | * | 4/1995 | Ostman .............................. 375/354 |
| 5,761,211 | * | 6/1998 | Yamaguchi et al. ................. 714/707 |
| 5,832,021 | | 11/1998 | Kondo .............................. 375/150 |
| 5,881,099 | * | 3/1999 | Takahashi et al. .................. 375/141 |
| 6,047,016 | * | 6/1998 | Ramberg et al. .................... 375/148 |

* cited by examiner

Primary Examiner—Chi Pham
Assistant Examiner—Jean B. Corrielus
(74) Attorney, Agent, or Firm—Venable; Robert J. Frank

(57) ABSTRACT

A code division multiple access (CDMA) receiver for receiving an encoded CDMA signal is disclosed, the receiver comprising an analog to digital converter for sampling a received signal and passing the thus sampled and digitized signal to a CDMA decoder, the converter receiving a sampling clock signal at a sampling frequency, the phase of the clock signal being adjustable. The CDMA decoder includes a plurality of sets of correlators, each set having a different base delay, each base delay being adjustable.

20 Claims, 9 Drawing Sheets

CDMA RECEIVER

BACKGROUND AND FIELD OF THE INVENTION

The present invention relates to a receiver for use with CDMA (code division multiple access) communication.

Direct sequence code division multiple access (DS-CDMA) is a technique for digital communications used particularly in cellular mobile communications. In this technique, a data signal is combined with a spreading waveform in the form of a pseudo random noise code (PN) to form a coded signal for transmission. The code has a frequency (the chip rate) which is a multiple of the frequency (the bit or symbol rate) of the data signal, so that an effect of combination of the data signal and spreading waveform is that the bit period is divided into smaller chip periods.

At the receiver, the processed signal is combined with the same spreading waveform to extract the data signal. The technique provides a high data capacity by spreading signal energy over a wide bandwidth to increase bandwidth utilization and reduce the effects of narrow band interference.

DS-CDMA requires that the spreading waveforms generated by transmitter and receiver are synchronized. If these two waveforms are out of synchronization by as little as one chip period, reliable communication cannot be achieved. The problem of synchronization is exacerbated by multipath effects, since the wireless channel from base station to mobile station is composed of several paths of different time delays, which vary due to the movement of the mobile station or Doppler shift effects.

A searcher formed by parallel correlators or matched filters is used to deal with rapid path changes caused principally by movement, while a plurality of Delay Locked Loops (DLL) are used to deal with slight changes in the phase of the spreading waveform caused principally by basic synchronization clock errors between transmitter and receiver or Doppler shift. Each path will have a corresponding portion of the receiver apparatus termed a "finger" including a DLL which keeps close track of phase fluctuations of the received signal from that path and adjusts its respective locally generated spreading waveform to follow the fluctuations.

DS-CDMA systems need to use an analogue to digital converter to sample and thus recover the received signal. In current systems, the converter includes a clock having a sampling rate of eight times the chip rate (CHIP8CLK). Each DLL uses this clock as a basis to adjust and align the phase of its locally generated spreading waveform. The smallest step of advance or retardation of the DLL's spreading waveform is thus ⅛ of the chip duration (Tc). Therefore, if the DLL works under perfect control, the timing error of each finger in tracking between the incoming and locally generated spreading waveforms is less than 1/16 Tc and the bit error rate (BER) performance degradation due to this error is negligible. However, if the sampling rate of the clock is reduced, performance degradation will increase to the point where reliable communication cannot be achieved.

In order to obtain higher capacity and support multimedia applications, systems using wide band code division multiple access (WCDMA) have been proposed. Such systems use a relatively wider band than the systems discussed above. However, operating in a wide band environment requires a corresponding increase in chip rate. This in turn requires a correspondingly faster sampling clock, which considerably increases cost and power consumption, since several internal modules operate under control of the clock.

It is an object of the invention to provide signal processing apparatus which alleviates this problem.

SUMMARY OF THE INVENTION

According to the invention there is provided a code division multiple access (CDMA) receiver for receiving an encoded CDMA signal, the receiver comprising an analog to digital converter for sampling the received signal and passing the thus sampled and digitized signal to CDMA decoding means, the converter receiving a sampling clock signal at a sampling frequency, the phase of the clock signal being adjustable.

Preferably, the decoding means is arranged to correlate the signal with spreading waveforms of different delays, to generate an error signal from the correlated signals and to generate a signal to adjust the phase of the clock signal in dependence upon the error signal. The decoding means may comprise a plurality of sets of correlators, the arrangement being such that a first correlator of each set receives a spreading waveform of a different base delay and second and third correlators of each set receive spreading waveforms which respectively lead and lag the base delay of the first correlator and the arrangement may be such that an error signal component for each set is derived from the outputs of the correlators of each set, the components from all the sets being summed to form the error signal.

Preferably a measure of the power of the output from the second correlator is subtracted from a measure of the power of the output of the third correlator to provide the error signal component, the phase of the clock signal being advanced if the error signal is positive and retarded if the error signal is negative. Preferably the phase of the clock signal is adjusted only when the magnitude of the error signal exceeds a first threshold.

The base delay may be adjustable and preferably the base delay is adjustable towards the dominant power of the outputs from the correlators of the set.

More preferably, the base delay is not adjusted when a measure of the power of the output from the first correlator is larger than a measure of the power of the outputs of either the second or third correlators by more than a second threshold. If the measure of the power of the output from the first correlator is smaller than the larger of the measures of the powers of the outputs of the second and third correlators by more than a third threshold then if the measure of the power of the output of the second correlator is larger than the measure of the power of the output of the third correlator, the phase of the base delay is advanced else the phase is retarded. If the measure of the power of the output from the first correlator is not smaller than the larger of the measures of the powers of the outputs of the second and third correlators by more than the third threshold and if the measure of the power of the output of the second correlator is larger than the measure of the power of the output of the third correlator then if the phase of the clock signal is to be retarded, then the phase of the base delay is advanced else the phase of the base delay is left unchanged. If the measure of the power of the output from the first correlator is not smaller than the larger of the measures of the powers of the outputs of the second and third correlators by more than the third threshold and if the measure of the power of the output of the third correlator is larger than the measure of the power of the output of the second correlator then if the phase of the clock signal is to be advanced, then the phase of the base delay is retarded else the phase of the base delay is left unchanged. Preferably the second and third thresholds are the same.

The described embodiment of the invention provides signal processing apparatus which allows the use of a lower sampling frequency, for example twice the chip rate (CHIP2CLK), while still providing acceptable communication reliability. In order to compensate for errors derived from the lower sampling rate, firstly adjustments are made to the phase of the clock signal for sampling the received signal and secondly a new algorithm is applied to adjust the phase of the clock signal used by each DLL for generating its local spreading waveform. In this context, adjustment of phase means change in the position of the leading edge of the clock waveform. It does not mean change of frequency of that waveform, which can be realized by automatic frequency control (AFC). With these adjustments, a preferred sampling point for the received signal may be established.

BRIEF DESCRIPTION OF THE DRAWINGS

An embodiment of the invention will now be described by way of example, with reference to the accompanying drawings, in which.

DETAILED DESCRIPTION OF THE PREFERRED EMBODIMENT

Figure 1:
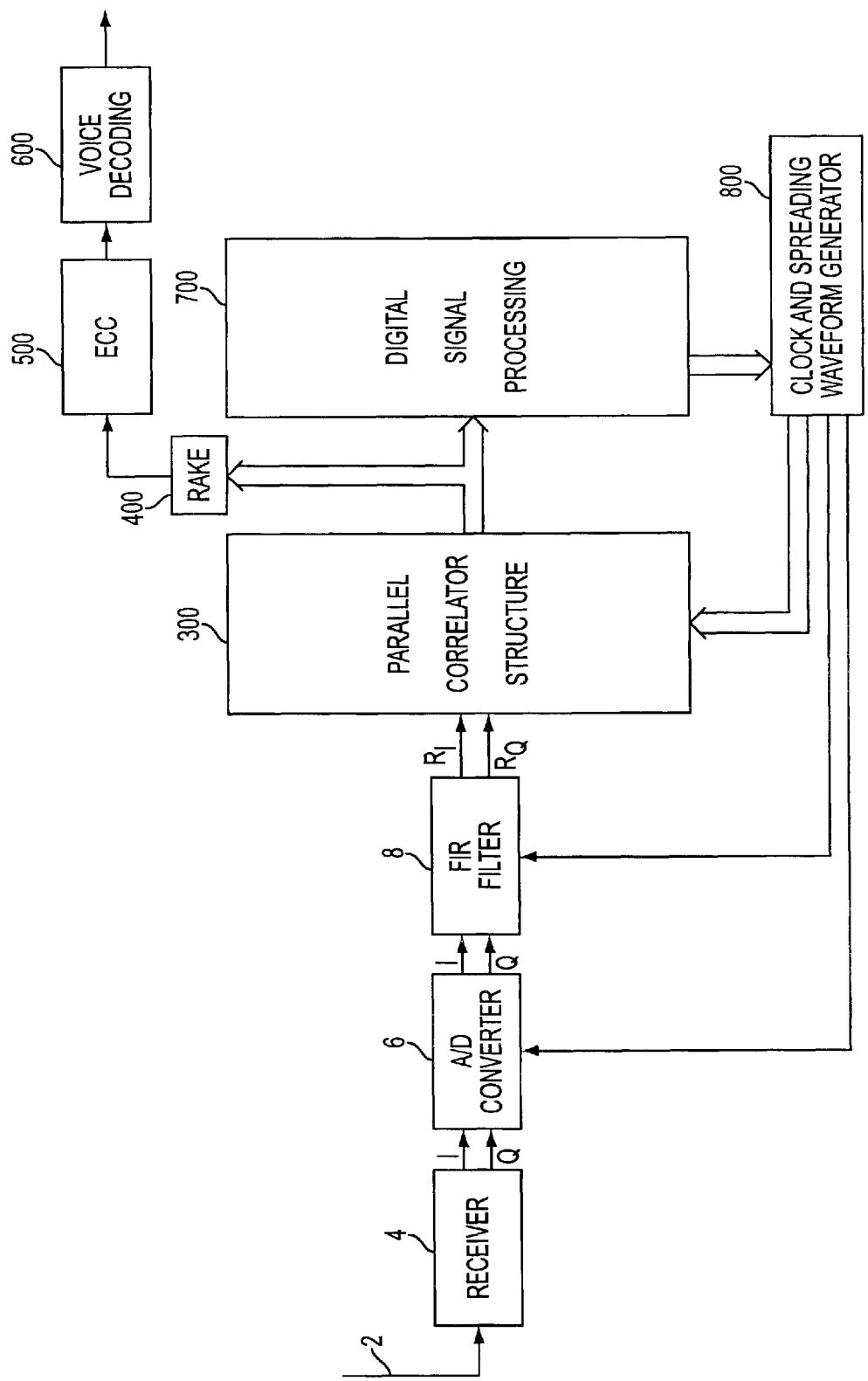
FIG. 1 is a block diagram illustrating an embodiment of a CDMA receiver of the invention, for receiving a transmitted data signal.

With reference to FIG. 1, a block diagram illustrating a CDMA receiver, for receiving a transmitted data signal is shown. An original WCDMA transmitted data signal is encoded and modulated using Quadrature Phase Shift Key (QPSK) modulation prior to RF transmission and is received by antenna 2 which passes the signal to a receiver 4 which down converts the RF signal to a baseband analog signal and extracts respective I (In-phase) and Q (Quadrature Phase) data signals which are passed to Analog to Digital Converter 6. A/D converter 6 (which in fact comprises two A/D converter modules, one for the I waveform and one for the Q waveform) converts the I and Q data signals to respective digital signals by sampling the data signals at a sampling frequency which are passed to a low pass Finite Impulse Response (FIR) shaping filter 8 which includes two filter modules for the I and Q signals respectively of standard construction which provides a shaped moving average of the signal and which receives a timing input at the sampling frequency to provide filtered outputs $R_I$ and $R_Q$.

The filtered outputs are passed to a parallel correlator structure 300 in which the outputs are correlated with spreading waveforms of different delays, to provide correlated outputs for two uses: firstly, user reception, via RAKE Combiner 400 which realises the time diversity of different paths and combines the correlated outputs, error correction coding 500 and voice decoding 600 modules and, secondly, for input to a digital signal processing module 700 which provides Searcher and Delay Locked Loop control processing and which outputs timing control signals to control the generation of the spreading waveforms and clock signals by clock and spreading waveform generator 800 to be input to the A/D converter 6, filter 8 and parallel correlator structure 300. The correlated outputs are used for user reception and digital signal processing simultaneously.

Figure 2:
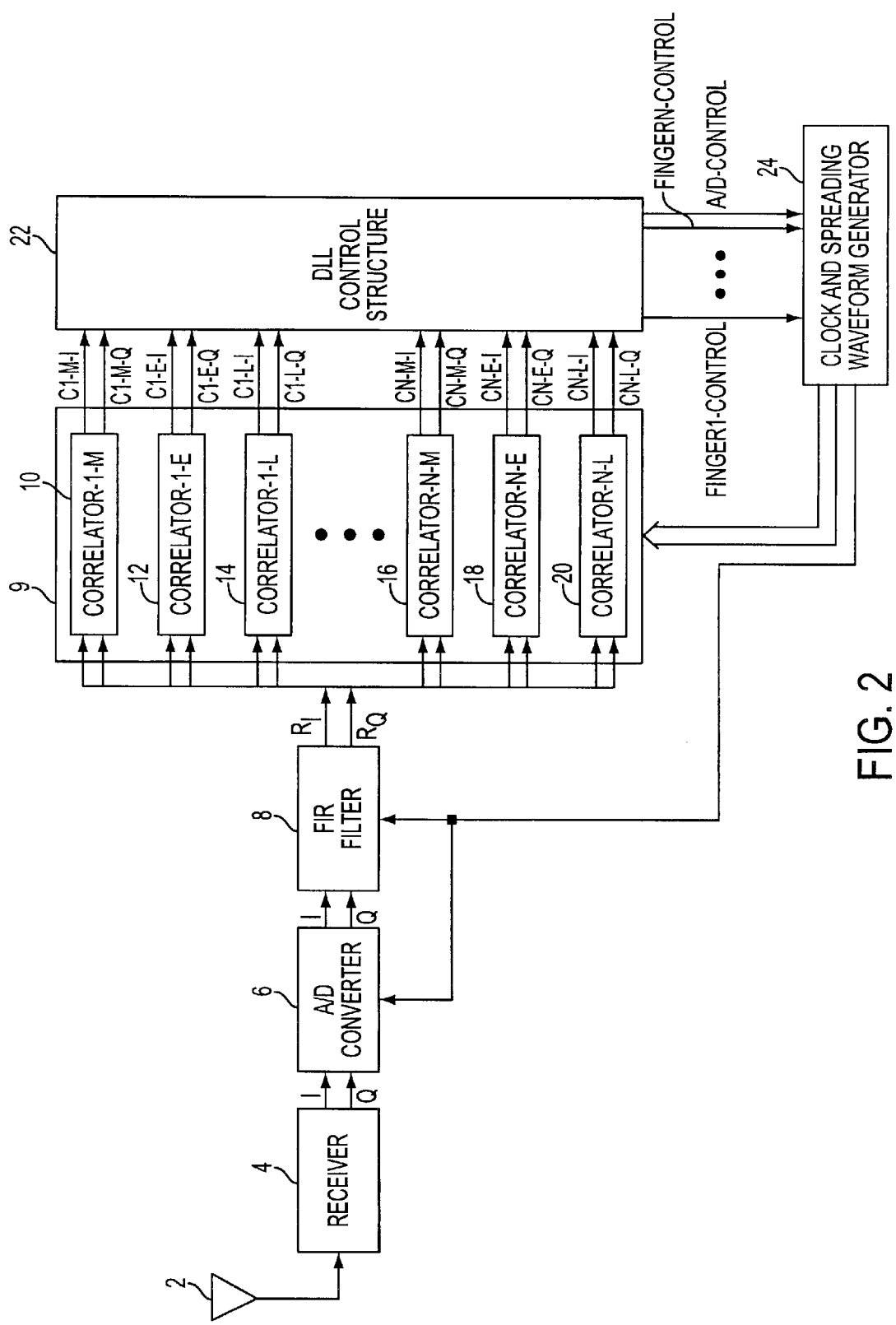
FIG. 2 is a schematic block diagram similar to FIG. 1 showing the parallel correlator and DLL control structure (of the digital signal processing module) in more detail.

FIG. 2 illustrates the CDMA receiver of FIG. 1 with particular reference to those portions of the modules of FIG. 1 concerned with Delay Locked Loop (DLL) control, which the described embodiment concerns. In this respect, the part 9 of the parallel correlator structure 300 used for DLL and the DLL control structure 22 part of the digital signal processing module 700 are shown in more detail.

Synchronization of the WCDMA signal is performed to ensure that the received signal, which is formed of a plurality of signals of different delays, is correctly correlated with the locally generated spreading waveforms. The processing is performed in two modes. In the first, initial search mode, the parallel correlator structure 9 is used to determine the strong signal paths and associated delays. In a subsequent, tracking mode, the parallel correlator structure 9 acts to correct for slight changes in the phase of the existing found strong signal paths. The description below illustrates the fine-tuning adjustment of the found signal paths using the DLL control structure 22 and clock and spreading waveform generator 24, it being assumed that the existing signal paths have already been established, in the manner known in the art.

The parallel correlator structure 9 comprises a plurality of sets of correlators each set having three correlators identified by the letter M, E and L. A set of correlators is provided for each found strong signal path (finger). In FIG. 2, two sets of correlators, for Finger 1, labelled 10,12,14 and for Finger N labelled 16,18,20 are shown. The outputs from the sets of correlators (each set has six outputs, I and Q for each M, E and L) are passed to a DLL control structure 22 which supplies inputs to the clock and spreading waveform generator 24 for controlling the phase of the clock signals and spreading waveforms for each set of correlators (Finger 1 Control–Finger N Control) and for the A/D converter and filter 8 (A/D Control). The generator provides output clock signals to A/D converter 6 and filter 8 and clock signals and spreading waveforms to correlators 10–20. The clock generator generates a clock signal, amongst other things, for the A/D converter 6, at twice the chip rate (CHIP2CLK), rather than eight times the chip rate (CHIP8CLK) as in the prior art, but adjusts the phase of the clock signal to provide a measure of compensation as will be hereinafter described.

Figure 3:
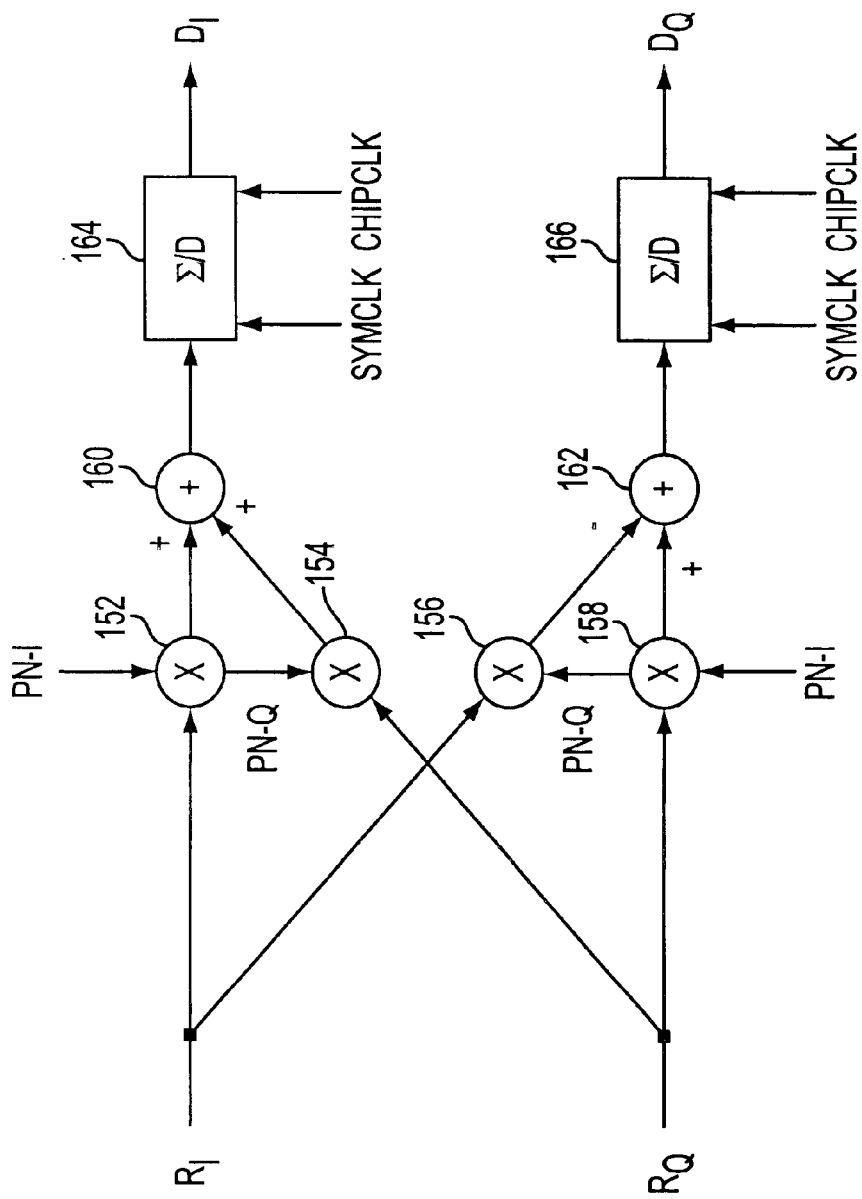
FIG. 3 is a schematic diagram illustrating a correlator of FIG. 2.

The structure of each correlator is shown in FIG. 3. Each correlator performs complex conjugate addition of the product of $R_I$ and $R_Q$ and respective locally generated I and Q spreading waveforms, to demodulate the signals and de-spread the incoming spread spectrum signals. Thus, four multipliers 152,4,6,8 are provided. Multiplier 152 multiplies signal $R_I$ with locally generated I spreading waveform PN-I, multiplier 154 multiplies signal $R_Q$ with locally generated Q spreading waveform PN-Q. Similarly, multiplier 156 multiplies $R_I$ with PN-Q and multiplier 158 multiplies $R_Q$ with PN-I. The outputs from multipliers 152 and 154 are added at summing element 160 and the output from multiplier 156 is subtracted from the output of multiplier 158 at subtraction element 162. The outputs from elements 160, 162 are fed to respective sum and dump ($\Sigma$/D) modules 164, 166.

Each sum and dump module performs a sampling of its input signal at the chip rate, using a timing clock input CHIPCLK. The samples are summed over the bit (symbol) duration using a further timing clock input SYMCLK at the bit (symbol) rate to provide a bit rate output signal.

Each set of correlators M, E, L receive I and Q spreading waveforms and clock signals SYMCLK and CHIPCLK which are subject to a different base delay determined by generator 24. Within each set, the delays of each correlator are different, but based upon the base delay. The correlators M (e.g correlator 10 of Finger 1) have a delay corresponding to the base delay, the correlators E (e.g. correlator 12 of Finger 1) have a delay of the base delay minus half the chip period Tc/2 and the correlators L (E.g. correlator 14 of Finger 1) have a delay of the base delay plus half the chip period Tc/2. Thus in each set, correlators M have a Middle delay, correlators E have a Tc/2 Earlier delay and correlators L have a Tc/2 Later delay.

Figure 4A:
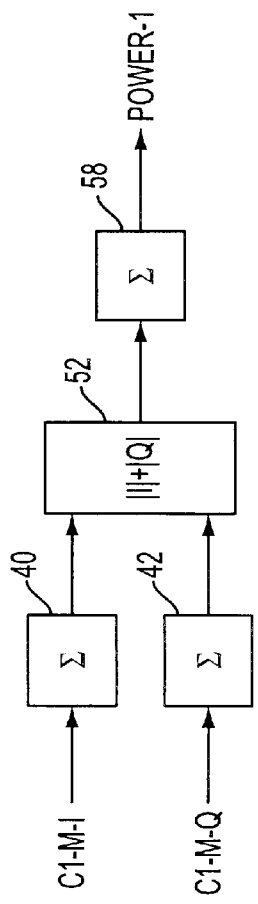
FIGS. 4A and 4B are schematic diagrams of parts of the DLL control structure of FIG. 2 receiving inputs from correlators 1-M, 1-E and 1-L and providing Error and Power outputs.
Figure 4B:
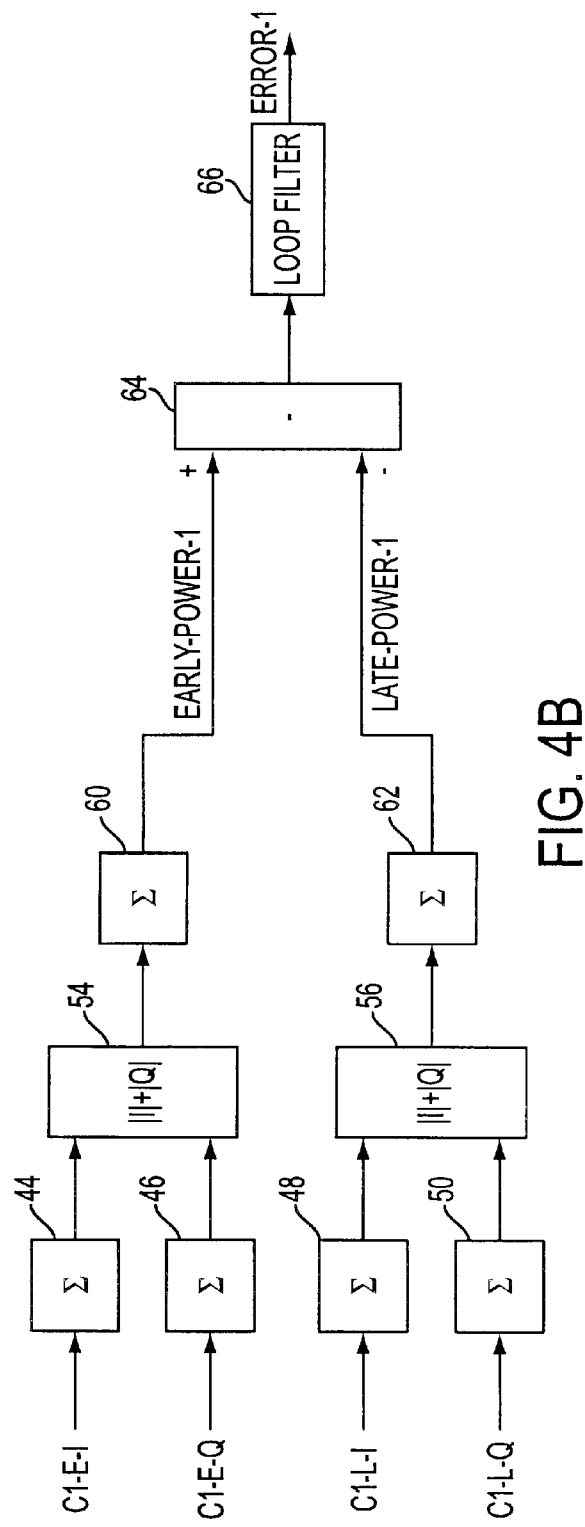

The outputs from all the correlators (C1-M-I & Q . . . CN-L-I and Q) are fed to DLL control structure 22 where outputs are initially processed as shown in FIGS. 4A and 4B which show the control structure for one set of correlators, in this case Finger 1. Coherent accumulators 40 and 42 (FIG. 4A) and coherent accumulators 44, 46, 48 and 50 (FIG. 4B) sum the I and Q outputs of the M, E and L correlators respectively. The sum periods for all coherent accumulators are the same and are chosen in accordance with performance requirements, in particular to minimize the effect of radio frequency error. The outputs from each I and Q pair of accumulators are fed to a M, E and L power calculation block 52, 54, 56 by calculating and summing the I and Q signal absolute values. This technique is preferred to summing the squared values $I^2+Q^2$ since the hardware complexity is reduced while performance degradation is not significant. However, squaring means could be employed if a more accurate power estimation is needed.

Figure 5:
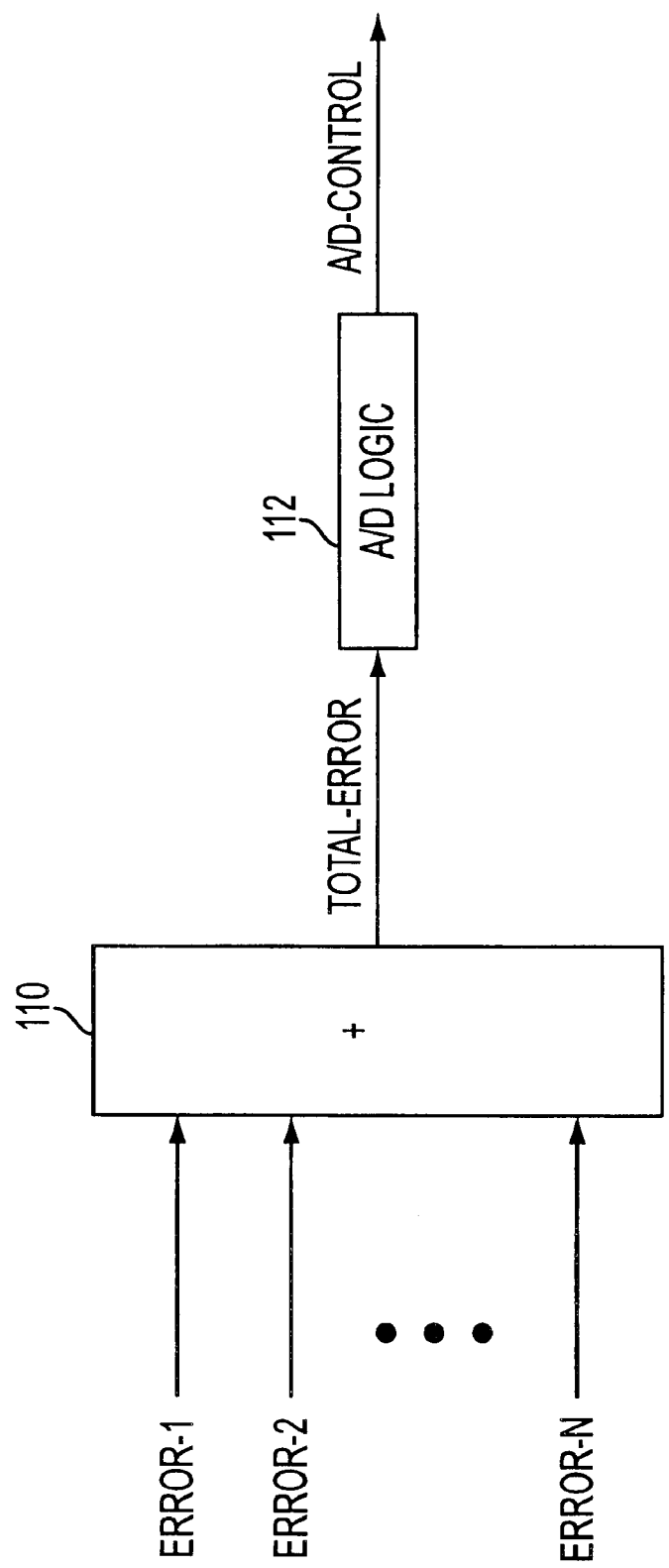
FIG. 5 is a schematic diagram of part of the DLL control structure of FIG. 2 which processes the Error output of FIG. 4.

Further non-coherent accumulators 58, 60, 62 then determine the average power outputs for the correlators M, E and L. The sum periods of the non-coherent accumulators 58, 60 and 62 are the same and are chosen based on the sum period of the coherent accumulators and total system performance requirements. In this respect, it is desirable for the phase of the A/D sampling clock and CHIPCLK and SYMCLK of each finger to be adjusted only once in a preferred time interval. The output POWER-1 from accumulator 58 is a power measure for the middle correlator M-1 of Finger 1. The outputs from accumulators 60, 62 are fed to a difference module 64 at which the power of the late L correlator of Finger 1 is subtracted from the power of the early E correlator of Finger 1. This is smoothed by a loop filter 66, the output of which, error signal component ERROR-1, is the contribution of Finger 1 for constructing a phase locked loop S-curve for controlling the A/D sampling clock. The ERROR outputs from all Fingers 1–N are fed to a summing element 110, as shown in FIG. 5, to provide a control signal TOTAL-ERROR which is fed to A/D logic 112 to provide the control signal A/D-CONTROL shown in FIG. 2 to change the phase of the A/D sampling clock and thus obtain the best sampling point for the received signal. The phase of the A/D sampling clock is advanced or retarded by generator 24 in Tc/8 increments in accordance with the value of signal A/D-CONTROL.

A/D logic 112 performs a comparison between TOTAL-ERROR and a threshold $\beta$ ($\beta>0$). $\beta$ is chosen empirically to prevent the signal A/D-CONTROL indicating that a change in the phase of the A/D sampling clock is needed when the total error is not great, indicating closeness to the optimum, as indicated in the following table. The actual values of the control signal A/D CONTROL are shown in brackets.

| TOTAL-ERROR | A/D-CONTROL |
| --- | --- |
| More than $\beta$ | Advance Tc/8 (1) |
| Less than $(-1.0 \times \beta)$ | Retard Tc/8 (−1) |
| Otherwise | No Change (0) |

In addition to controlling the phase of the A/D sampling clock in the manner described above, the embodiment of the invention also acts to control the phase of the clock signals CHIPCLK and SYMCLK and the phase of the locally generated I and Q spreading waveforms for the set of correlators of each finger 1–N, as now explained with reference to FIGS. 6 and 7, in which Finger 1 is used as an example, although it will be appreciated that the same technique is used for every finger.

Figure 6:
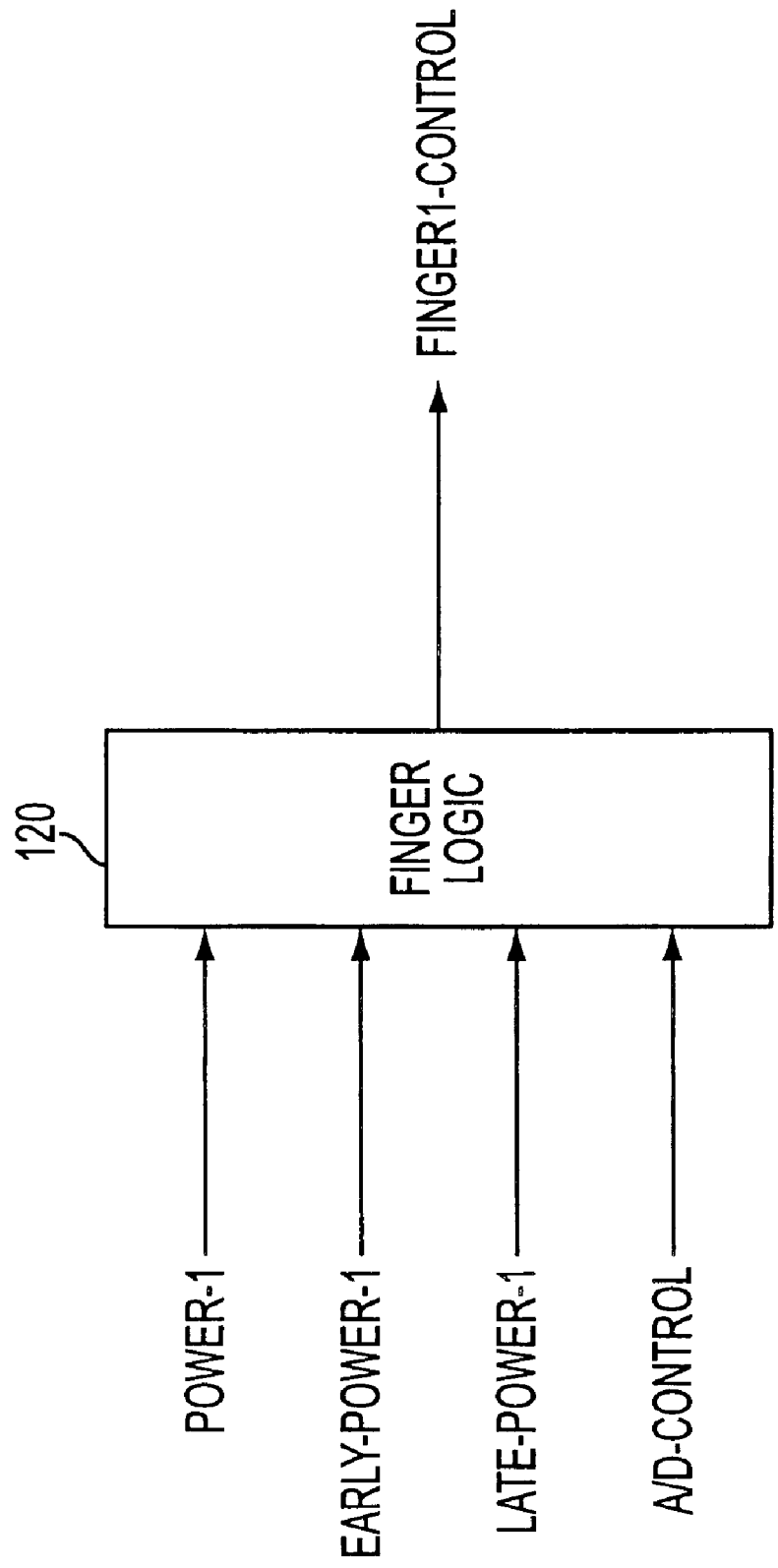
FIG. 6 is a schematic diagram of part of the DLL control structure of FIG. 2 which processes the Power output of FIG. 4 and A/D-CONTROL output of FIG. 5.
Figure 7:
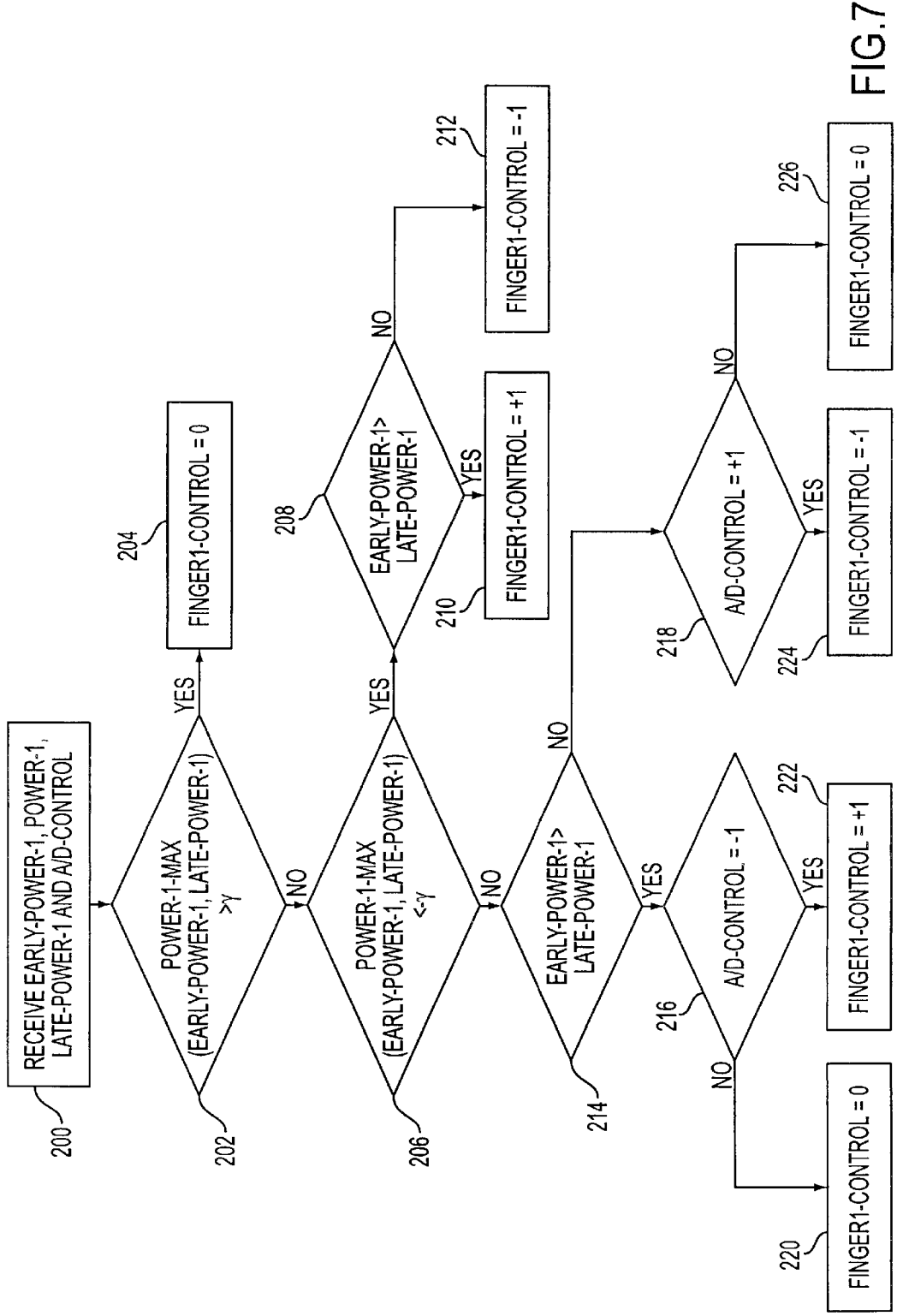
FIG. 7 is a flow chart illustrating the operation of the finger logic of FIG. 6.

As shown in FIG. 6, the three power signals POWER-1, EARLY POWER-1 and LATE POWER-1, together with the control signal A/D-CONTROL are input to a finger logic module 120 which performs the logical operations illustrated in the flowchart of FIG. 7. Essentially, the logic module attempts to change the middle phase of the finger towards that of the dominant power of the three input power signals, provided a threshold $\gamma$ is not exceeded. This threshold is used to prevent the phase being changed when the powers are about the same, indicating current closeness to an optimum level.

At step 200 the signals are received and at step 202 if the signal POWER-1 is greater than the larger of the signals EARLY POWER-1 and LATE POWER-1 by more than $\gamma$, this indicates that POWER-1 is the dominant power, so the phase of the base frequency of finger 1 is left unchanged (control signal FINGER1–CONTROL=0). If not, at step 206, if the signal POWER-1 is less than the larger of the signals EARLY POWER-1 and LATE POWER-1 by more than $\gamma$, it is determined at step 208 which of EARLY POWER-1 and LATE POWER-1 is larger. If EARLY POWER-1 is larger, the phase of the base frequency of finger 1 is advanced by Tc/2 (control signal FINGER1–CONTROL=1). If LATE POWER-1 is larger, the phase of the base frequency of finger 1 is retarded by Tc/2 (control signal FINGER1–CONTROL=−1).

If at step 206, the signal POWER-1 is not less than the larger of the signals EARLY POWER-1 and LATE POWER-1 by more than $\gamma$, indicating that the signals are about the same size, it is determined at step 214 which of EARLY POWER-1 and LATE POWER-1 is larger. If EARLY POWER-1 is larger, at step 216 it is determined if the signal A/D CONTROL is −1 indicating that the phase of the A/D Converter sampling clock is to be retarded. If this is true, the phase of the base frequency of finger 1 is advanced by Tc/2 (control signal FINGER1–CONTROL=1) at step 222. If not, the phase of the base frequency of finger 1 is left unchanged (control signal FINGER1–CONTROL= 0) at step 220. If LATE POWER-1 is larger, at step 218 it is determined if the signal A/D CONTROL is +1 indicating that the phase of the A/D Converter sampling clock is to be advanced. If this is true, the phase of the base frequency of finger 1 is retarded by Tc/2 (control signal FINGER1-CONTROL=−1) at step 224. If not, the phase of the base frequency of finger 1 is left unchanged (control signal FINGER1-CONTROL=0) at step 226.

Figure 8:
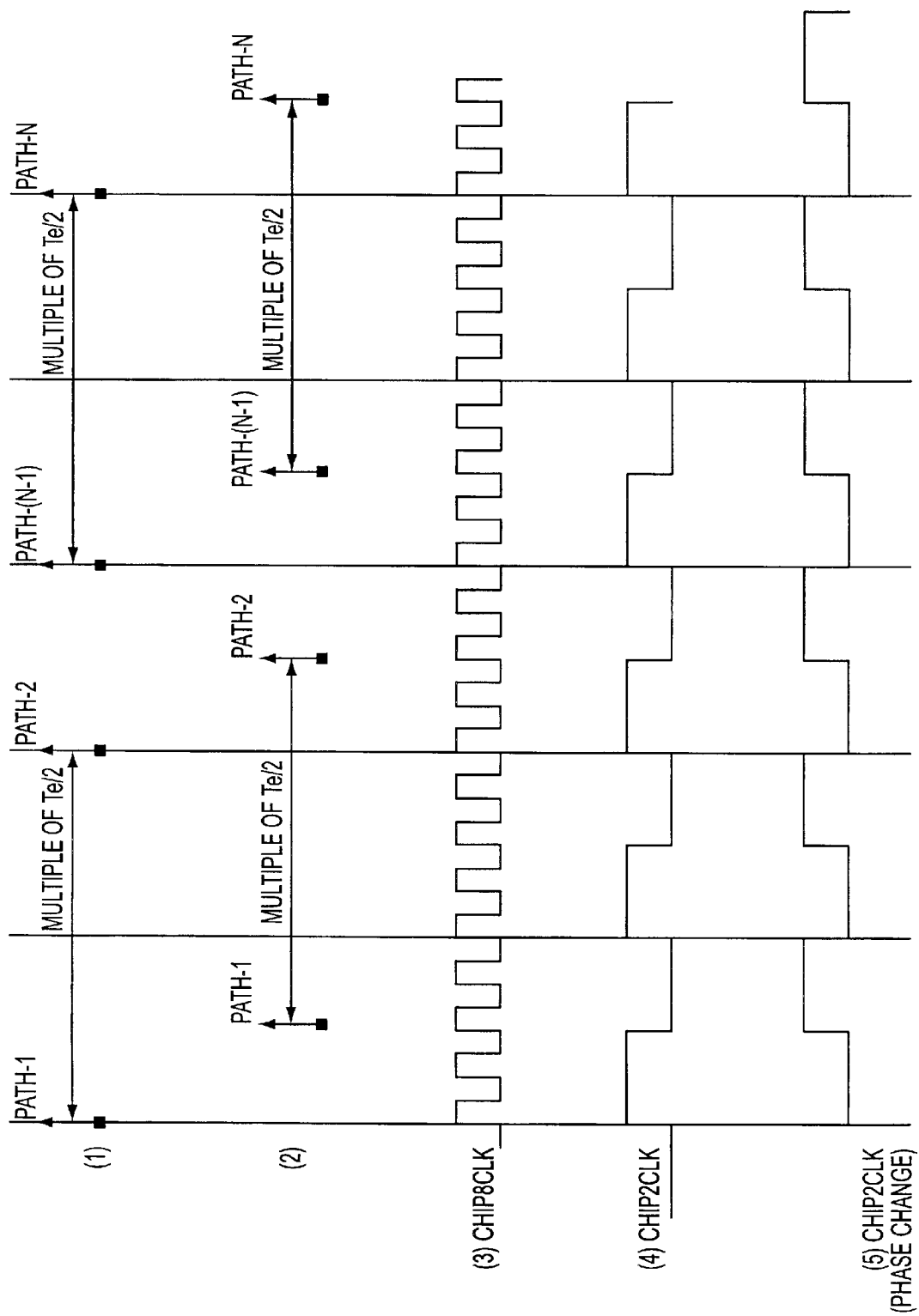
FIG. 8 is a timing diagram illustrating operation of the embodiment of the invention.
Figure 9:
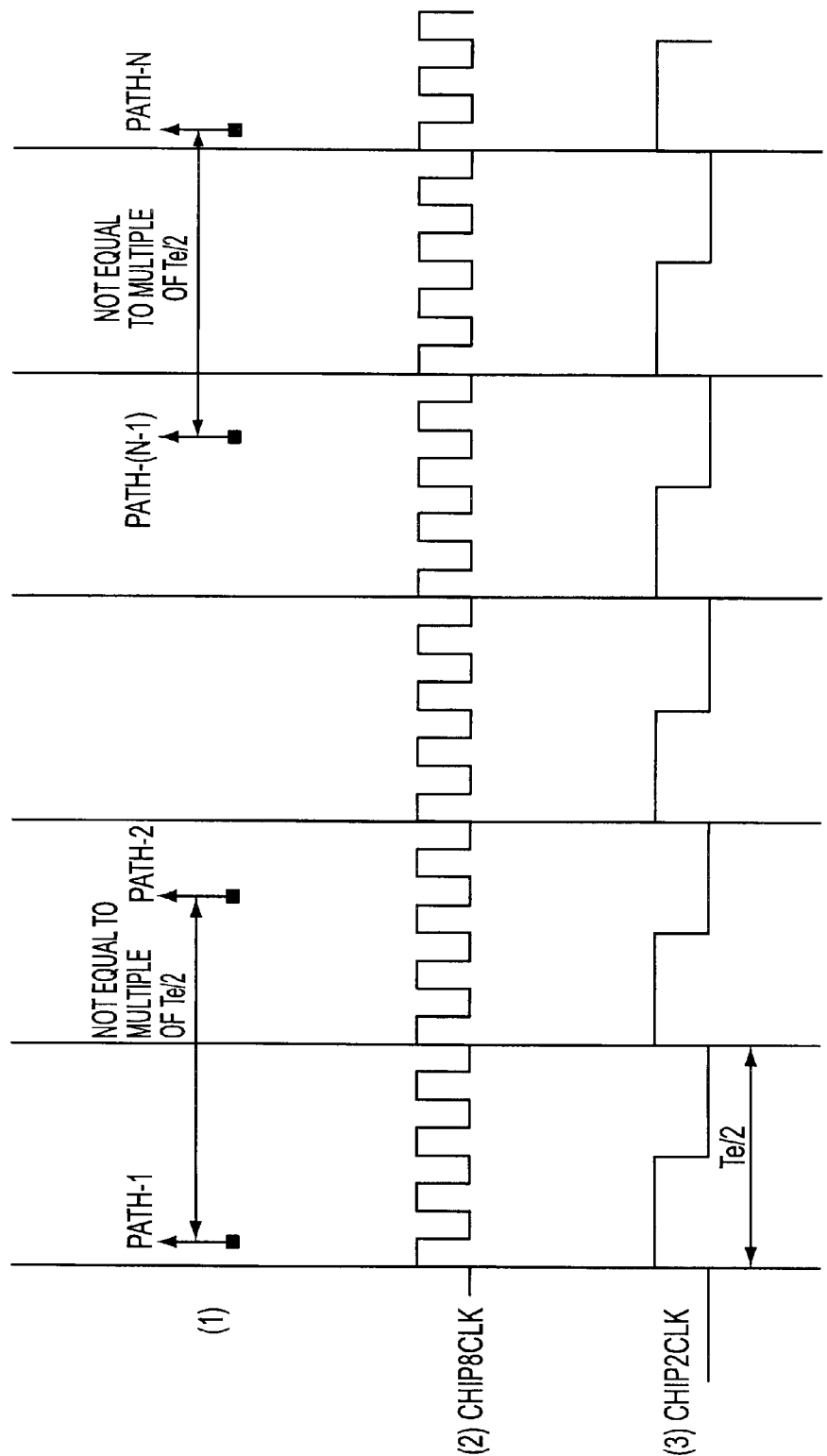
FIG. 9 is a timing diagram illustrating a general case for the embodiment of the present invention.

The effect of this embodiment of the invention will now be explained with reference to FIGS. 8 and 9.

With the A/D sampling clock sampling at a speed of twice the chip rate (CHIP2CLK), in a conventional system, the phase of the A/D sampling clock would be fixed. Thus, if the distance between any two paths are multiples of Tc/2 and all paths coincide with the rising edge of the A/D sampling clock, as shown in FIG. 8(1), (3) and (4), there is no performance difference between using a sampling clock at twice the chip rate CHIP2CLK or a sampling clock at eight times the chip rate CHIP8CLK. However, if all the paths do not coincide with the rising edge of CHIP2CLK as shown in FIG. 8(2) and (4), a large BER degradation will occur.

In the present embodiment, the phase of the clock signal input to the A/D converter 6 is not kept fixed but is adjustable by Tc/8 by the control logic described above to track a preferred sampling point. Thus, the phase of the clock signal of A/D converter 6 is adjusted from FIG. 8(4) to FIG. 8 (5) to track the paths shown in FIG. 8(2).

As further provided in the embodiment described above, the phase of the clocks and spreading waveform of each finger may be adjusted by Tc/2 independently of the phase of the clock signal of the A/D converter 6, so that nine different relative adjustments of the phase of each finger in a preferred time interval can be made as follows:

| A/D-CONTROL | FINGER-CONTROL | OPERATION |
| --- | --- | --- |
| 0 | 1 | Advance ½ Tc |
| 0 | −1 | Retard ½ Tc |
| 0 | 0 | No Change |
| 1 | 1 | Advance(½ + ⅛) Tc |
| 1 | −1 | Retard(½ − ⅛) Tc |
| 1 | 0 | Advance ⅛ Tc |
| −1 | 1 | Advance(½ − ⅛) Tc |
| −1 | −1 | Retard(½ + ⅛) Tc |
| −1 | 0 | Retard ⅛ Tc |

The inventors have evaluated BER performance for the described embodiment by conducting simulations using different sampling clocks CHIP8CLK and CHIP2CLK, the phase of which is kept fixed and for CHIP2CLK, the phase of which is adjusted in the manner described above. The general case illustrated in FIG. 9 is considered, where the distance between any two paths may or may not be equal to multiples of Tc/2. With a symbol (bit) rate of 32 Ksps, a chip rate of 4.096 Mcps, roll-off factor of 0.22 for the Nyquist shaping filter, the existence of four strong paths of the same average power, the performance degradation due to the different A/D sampling clocks when compared with a fixed phase CHIP8CLK sampling clock under a plurality of AWGN or Rayleigh fading channels is as follows:

|  | CHIP2CLK FIXED PHASE | | CHIP2CLK PHASE ADJUSTED | |
| --- | --- | --- | --- | --- |
|  | Worst Case | Best Case | Worst Case | Best Case |
| AWGN | −1.1dB | −0.0dB | −0.3dB | −0.0dB |
| 80 Hz Rayleigh Fading | −0.8dB | −0.0dB | −0.2dB | −0.0dB |
| 160 Hz Rayleigh Fading | −0.8dB | −0.0dB | −0.2dB | −0.0dB |

The described embodiment is not to be construed as limitative. For example, the adjustments to the phase of A/D sampling clock and the phases of the CHIPCLK, SYMCLK and spreading waveform of each finger have been shown used together.

However, the adjustment of the phase of the A/D sampling clock may be made on its own. Furthermore, the technique is applicable for use with any other clock frequency, for example four times the chip rate (CHIP4CLK), to obtain better system performance.

What is claimed is:

1. A code division multiple access (CDMA) receiver for receiving an encoded CDMA signal, the receiver comprising an analog to digital converter for sampling the received signal and passing the sampled and digitized signal to CDMA decoding means, the converter receiving a sampling clock signal at a sampling frequency, the phase of the clock signal being adjustable, said decoding means correlating the digital signal with spreading waveforms of different delays to provide a plurality of correlated signals, an error signal being generated from the correlated signals and a signal to adjust the phase of the clock signal being generated in dependence upon the error signal.

2. A receiver as claimed in claim 1 wherein the decoding means comprises a plurality of sets of correlators, the arrangement being such that a first correlator of each set receives a spreading waveform of a different base delay and second and third correlators of each set receive spreading waveforms which respectively lead and lag the base delay of the first correlator.

3. A receiver as claimed in claim 2, the arrangement being such that an error signal component for each set is derived from the outputs of the correlators of each set, the components from all the sets being summed to form the error signal.

4. A receiver as claimed in claim 3 wherein a measure of the power of the output from the second correlator is subtracted from a measure of the power of the output of the third correlator to provide the error signal component.

5. A receiver as claimed in claim 4 wherein the phase of the clock signal is advanced if the error signal is positive and retarded if the error signal is negative.

6. A receiver as claimed in claim 5 wherein the phase of the clock signal is adjusted only when the magnitude of the error signal exceeds a first threshold.

7. A receiver as claimed in claim 6 wherein the base delay is adjustable.

8. A receiver as claimed in claim 7, wherein the base delay is not adjusted when a measure of the power of the output from the first correlator is larger than a measure of the power of the outputs of either the second or third correlators by more than a second threshold.

9. A receiver as claimed in claim 8 wherein if the measure of the power of the output from the first correlator is smaller than the larger of the measures of the powers of the outputs of the second and third correlators by more than a third threshold then if the measure of the power of the output of the second correlator is larger than the measure of the power of the output of the third correlator, the phase of the base delay is advanced else the phase is retarded.

10. A receiver as claimed in claim 9 wherein if the measure of the power of the output from the first correlator is not smaller than the larger of the measures of the powers of the outputs of the second and third correlators by more than the third threshold and if the measure of the power of the output of the second correlator is larger than the measure of the power of the output of the third correlator then if the phase of the clock signal is to be retarded, then the phase of the base delay is advanced else the phase of the base delay is left unchanged.

11. A receiver as claimed in claim 9 wherein if the measure of the power of the output from the first correlator is not smaller than the larger of the measures of the powers of the outputs of the second and third correlators by more than the third threshold and if the measure of the power of the output of the third correlator is larger than the measure of the power of the output of the second correlator then if the phase of the clock signal is to be advanced, then the phase of the base delay is retarded else the phase of the base delay is left unchanged.

12. A receiver as claimed in claim 9 wherein the second and third thresholds are the same.

13. A receiver as claimed in claim 7 wherein the base delay is adjustable towards the dominant power of the outputs from the correlators of the set.

14. A receiver as claimed in claim 2 wherein the base delay is adjustable.

15. A receiver as claimed in claim 3 wherein the base delay is adjustable.

16. A receiver as claimed in claim 4 wherein the base delay is adjustable.

17. A receiver as claimed in claim 5 wherein the base delay is adjustable.

18. A receiver as claimed in claim 10 wherein if the measure of the power of the output from the first correlator is not smaller than the larger of the measures of the powers of the outputs of the second and third correlators by more than the third threshold and if the measure of the power of the output of the third correlator is larger than the measure of the power of the output of the second correlator then if the phase of the clock signal is to be advanced, then the phase of the base delay is retarded else the phase of the base delay is left unchanged.

19. A receiver as claimed in claim 10 wherein the second and third thresholds are the same.

20. A receiver as claimed in claim 11 wherein the second and third thresholds are the same.

* * * * *